(12) United States Patent
Voigt (10) Patent No.: US 8,522,406 B2
(45) Date of Patent: Sep. 3, 2013

(54) RELEASABLE FASTENING ALONG A BEAD

(75) Inventor: Paul Joseph Voigt, Waterdown (CA)

(73) Assignee: Velcro Industries B.V., Willemstad, Curacao ( * ) Notice: Subject to any disclaimer, the term of this patent is extended or adjusted under 35 U.S.C. 154(b) by 0 days.

(21) Appl. No.: 13/508,839

(22) PCT Filed: Oct. 20, 2010

(86) PCT No.: PCT/IB2010/002856
§ 371 (c)(1),
(2), (4) Date: May 29, 2012

(87) PCT Pub. No.: WO2011/058415
PCT Pub. Date: May 19, 2011

(65) Prior Publication Data
US 2012/0240364 A1 Sep. 27, 2012

Related U.S. Application Data

(60) Provisional application No. 61/259,727, filed on Nov. 10, 2009.

(51) Int. Cl.
*B60N 2/58* (2006.01)
*A44B 18/00* (2006.01)

(52) U.S. Cl.
USPC .......... 24/306; 24/591.1; 297/452.6

(58) Field of Classification Search
USPC ............ 24/306, 591.1, DIG. 44, DIG. 45, 24/DIG. 51; 297/452.6
See application file for complete search history.

(56) References Cited

U.S. PATENT DOCUMENTS

| | | | |
|---|---|---|---|
| 5,187,843 A | 2/1993 | Lynch | |
| 5,236,243 A | 8/1993 | Reyes | |
| 5,273,511 A | 12/1993 | Boeckman | |
| 5,293,672 A | 3/1994 | Tominaga et al. | |
| 5,403,094 A * | 4/1995 | Tomic | 383/63 |
| 5,839,831 A | 11/1998 | Mazzocchi | |
| 5,878,468 A | 3/1999 | Tomic et al. | |
| 5,900,303 A | 5/1999 | Billarant | |
| 5,934,806 A | 8/1999 | Tomic et al. | |
| 6,138,329 A | 10/2000 | Johnson | |
| 6,152,600 A | 11/2000 | Tomic | |
| 6,167,597 B1 | 1/2001 | Malin | |
| 6,692,147 B2 * | 2/2004 | Nelson | 383/63 |
| 6,877,898 B2 | 4/2005 | Berich et al. | |
| 7,216,405 B2 | 5/2007 | Gradl | |
| 7,270,479 B2 * | 9/2007 | Nelson | 383/63 |
| 2002/0101109 A1 | 8/2002 | Stiller et al. | |
| 2008/0120815 A1 | 5/2008 | Line | |
| 2009/0096274 A1 * | 4/2009 | Pedde et al. | 297/452.61 |

OTHER PUBLICATIONS

International Preliminary Report on Patentability for International Application No. PCT/IB2010/002856 mailed Dec. 9, 2011.

* cited by examiner

*Primary Examiner* — Robert J Sandy
(74) *Attorney, Agent, or Firm* — Fish & Richardson P.C.

(57) ABSTRACT

A releasable touch fastening includes a fastener strip (2) and a retention bead (20). The fastener strip includes two parallel rows (6) of opposing closely spaced fastener elements (8) extending from a common base (4) to form a retention channel (10). The two rows are separated by a small distance to receive and capture the retention bead constructed to fit between the fastener rows and under the heads (14) of the fastener elements.

16 Claims, 8 Drawing Sheets

RELEASABLE FASTENING ALONG A BEAD

CROSS REFERENCE TO RELATED APPLICATIONS

This application is a §371 National Stage Application of International Application No. PCT/IB2010/002856, filed Oct. 20, 2010, which claims priority to U.S. Provisional Application No. 61/259,727, filed Nov. 10, 2009, each of which is incorporated herein by reference in its entirety.

TECHNICAL FIELD

This invention relates to releasable fastening along a bead, and more particularly to such fastening in the anchoring of a fabric panel to a supporting foam structure.

BACKGROUND

Furniture, automotive seat coverings and other upholstery applications have long employed hog rings, stitching or fasteners to secure the edges or seams of the upholstery or other fabric panels to an underlying structure, e.g., a seat or furniture frame.

Seats for cars and light trucks have been formed by molding a foam bun that serves as the seat cushion. A pre-stitched fabric cover is then attached to the foam bun. Often, the fabric cover is attached to the foam bun by insert molding touch fastener strips into the outer surface of the foam bun and attaching cooperating touch fastener products to an inner surface of the fabric cover. The mating portion of the separable fastener is attached to the seat cover to provide releasable attachment to the foam seat bun.

In some assemblies, a magnetically attractive material is attached to the fastener to temporarily hold the fastener in a trough or channel of the mold cavity wall, which is equipped with magnets. It is also possible to incorporate magnetically attractive material into the body of the fastener itself, such as in a plastic material that is used to make the fastener.

The touch fastener strips on the foam bun are typically recessed in trenches, to allow the seams in the fabric cover to be indented below the surface of the seat cushion. Indenting the seams in this manner forms aesthetically appealing indented creases in the surface of the seat cushion upholstery for a tailored look. The trenches also accommodate the additional thickness of upholstery fabric that is created where the seam is stitched.

The molded resin article is covered along its contour with a seat cover (i.e., upholstery material) by the engaging function between the engaging elements on the inner surface of the seat cover and the engaging elements of the fastener strip.

Generally, the fastener products are attached to the fabric cover along the seams where the cover is stitched together and held in place by the seam stitching. The touch fastener products allow the seat manufacturer to rapidly and semi-permanently attach the fabric cover to the foam bun by pulling the fabric cover over the foam bun and pressing the seam of the fabric cover down in to the foam bun trench to engage the cooperating touch fastener products on the foam bun and fabric.

Figure 1:
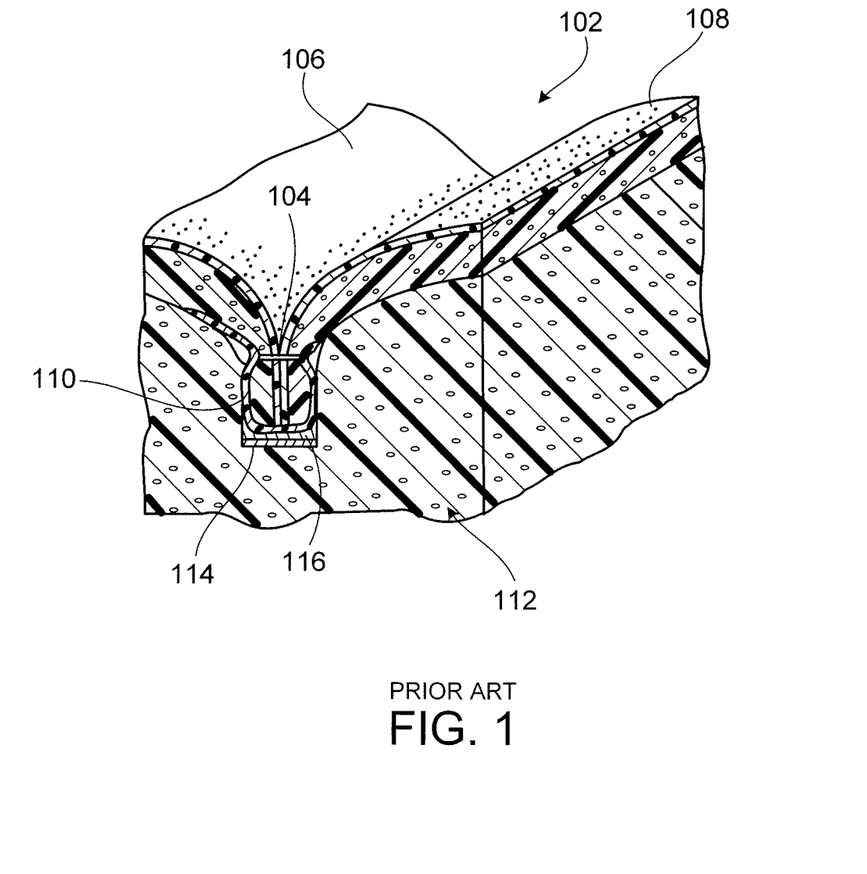
FIG. 1 is a sectional view of a prior art touch fastener anchored seating installation with a seat cushion and fabric cover.

FIG. 1 illustrates an example of a prior art seat covering installation 102 in which a fabric seam 104 between fabric panels 106, 108 is retained within a trench 110 in a seat foam bun 112 via a touch fastener strip 114 in trench 110 and a cooperative touch fastener material, e.g., loops 116 secured along an edge of seam 104. Some examples of the use of fastener strips to secure fabric panels to automotive seat foam buns are disclosed in U.S. Pat. Nos. 7,077,473 and 7,108,904.

Other prior art installations employ point attachment or clip systems, e.g., hog rings with attachment or anchor points approximately 100 mm apart. Such installations can be prone to creep, resulting in puckering or trim wrinkles near the attachment points. Such systems can also require a high force to engage the bead into the clip. Accordingly, improvements are sought in the efficacy and efficiency of attachment or anchoring of upholstery, fabrics and other panels or materials.

SUMMARY

Various aspects of the invention feature a strip of opposing rows of fastener elements forming a retention channel and engaging with a complementary retention bead. The opposing fastener elements deflect individually, reducing the force required for engagement. The close proximity of the fastener elements provides a substantially continuous anchoring system and can reduce creeping and puckering of the fabric trim. The close spacing of many smaller fastening elements can provide an advantageously low force requirement for engagement and disengagement, as compared, for example, with conventional, widely-spaced point attachment systems. The fastener elements can be formed by several methods, such as extrusion-cut-and-stretch or discrete element molding techniques.

One aspect of the invention features a releasable touch fastening comprising two mating strips. One strip has a base with parallel rows of opposed discrete fastener elements extending from the base and defining a retention channel between the rows, the discrete fastener elements each comprising a stem and a head. The other strip has an attachment web with a longitudinal retention bead extending along the web, the bead being constructed to be removably received and retained in the retention channel between the rows of the fastener elements.

Engaged, the bead is retained under the heads of the fastener elements. In some cases, the bead defines recesses that receive the tip of the fastener elements.

In some implementations, the opposed discrete fastener elements are substantially aligned across the retention channel. In some implementations, the fastener elements are offset across the retention channel.

In some cases, the discrete fastener elements within a row are spaced or arranged at a density of between about 5 and 50 fastener elements per lineal inch (2-20 per cm).

In some implementations, the discrete fastener elements are cut from a substantially continuous rail. In some cases, the cut rail is stretched to space the discrete elements apart.

In some implementations, the discrete fastener elements are molded onto the base. In some cases, the base is flexible; in others, it is substantially rigid. In some instances, the discrete fastener elements and the base are integrally formed of a substantially seamless body of resin.

In some implementations, the heads of the discrete fastener elements are directed inwardly towards the retention channel. In some cases, the heads of the discrete fastener elements define a crook and the bead defines projections configured to nest with the crook to resist separation of the bead and fastener elements. The tip of the crook of the fastener elements can be received in a recess in the bead to resist outward deflection of the fastener elements relative to the retention channel during separation loading.

In some implementations, the rows of fastener elements are intermittent or arranged as segments comprising a plurality of the opposing discrete fastener elements.

In some implementations, the base and/or bead are notched or segmented to permit flexure within the plane of the base. In some implementations, the bead is substantially longitudinally continuous. In some implementations, the base and web are each segmented to provide flexibility to the fastened base and web in a plane of each.

The discrete fastener elements are constructed and arranged to individually deflect upon insertion of the longitudinal bead into the retention channel and to collectively retain the bead within the retention channel.

In some instances, the discrete fastener elements are spaced apart less than about one width of a fastener element.

In some implementations the bead and attachment web are integrally formed of a seamless body of resin. In some instances, the bead is substantially continuous and the attachment web is segmented to allow bending within the plane of the attachment web.

In some implementations the base includes a longitudinal portion of reduced stiffness, e.g., a groove, adjacent at least one of the rows to provide increased flexibility. This can also be advantageous in improving adhesion to a foam cushion.

In some implementations, the fastener strip further includes a magnetically attractable material disposed on the base, such as to retain the base within an injection mold via magnetic attraction.

In some implementations, the base defines selvedges that are configured to help bond the fastener strip to a molded article. In some instances, the selvedges are configured to conform to a mold contour to substantially prevent incursion of foam into the retention channel during a foam molding process.

In some implementations, the bead is integral with the attachment web. The web can be sewn, adhered or otherwise connected to a fabric seam or fabric panel edge.

In some implementations, the web comprises a portion of a fabric panel. In some cases, the bead is formed on the fabric panel.

In some implementations, the fastener strip further includes a second pair of opposed rows of discrete hooks in parallel with a first pair of opposed rows, configured to retain a second bead.

In some implementations, the base has projections on a rear surface, opposite a surface bearing the fastener elements, with the projections configured to anchor the strip to a molded article.

In some implementations the discrete fastener elements are loop engageable, male touch fastener elements. In some cases, the discrete fastener elements have an overall height of about 3 to 10 mm, with about 2 to 5 hooks per lineal cm. The width of the discrete fastener elements, at the hook, can be between about 0.5 mm and 4 mm, for example. In a particular implementation, the hook is about 2 mm wide. In some cases, the discrete fastener elements have an overall height of about 0.2 inch (5 mm) as measured normal to the surface of the strip base, and are arranged in an array having a hook density of about 12 hooks per linear inch (5 hooks per linear cm).

In some implementations, the discrete fastener elements each include a substantially resilient crook configured to resiliently deform to incrementally release the bead from within the retention channel. In some instances, the stems of the discrete fastener elements are substantially resilient in at least two orthogonal directions. In some instances, the crooks distend or twist under sufficient extraction force on the bead.

In some implementations, the retention channel includes at least first and second distinct engagement profiles. In some instances, the first and second distinct engagement profiles are formed of fastener elements of different lengths. In some instances, the first and second distinct engagement profiles are formed by first and second hooks positioned at different heights within the rows. In some cases, the first and second hooks are formed on the same stems. In some instances, the bead comprises first and second engagement profiles configured to engage, respectively, the first and second profiles of the retention channel. In some instances, the first engagement profile of the bead is sequentially engageable with the first and second engagement profiles of the retention channels.

In some examples, the fastener strip has additional rows of fastener elements forming additional retention channels on the base. In some instances a second attachment bead is positioned adjacent the first attachment bead for engaging two adjacent retention channels. In some instances, a row of fastener elements forms a portion of more than one retention channel. In some cases, at least some of the discrete fastener elements comprise multiple hooks extending in opposed directions to form part of two adjacent retention channels.

In some cases the channel extends beyond either end of the bead, such that disengagement forces at the bead ends are distributed across a greater area of adhesion between the base and underlying foam.

Another aspect of the invention features a method of molding a foam article including a releasable touch fastener strip. The method includes providing within a mold cavity a fastener strip comprising a base and parallel rows of multiple opposed discrete fastener elements extending from the base and defining a retention channel between the rows, the discrete fastener elements each comprising a stem and a hook. The method further includes pressing the retention channel onto a mold surface feature constructed to be removably received in the retention channel between the rows of the fastener elements, whereby the discrete fastener elements collectively retain the mold surface feature within the retention channel to secure the fastener strip within the mold cavity; and introducing a foam resin into the mold cavity and curing the foam whereby the fastener strip is bonded to a cured foam article.

In some applications, the method includes removing the foam article with the fastener strip from the mold cavity and securing a covering to the foam article by inserting into the retention channel a longitudinal retention bead extending along either a seam or an edge of the fabric panel.

Another aspect of the invention features a method of covering a cushion. The method includes providing, on a cushion, a releasable touch fastener strip having a base with parallel rows of multiple opposed discrete fastener elements extending from the base and defining a retention channel between the rows. The discrete fastener elements each have a stem and a hook. The method further includes providing, at a seam or an edge portion of a fabric covering, a longitudinal retention bead constructed to be removably received and retained in the retention channel between the rows of the fastener elements, and securing the fabric covering to the cushion by inserting the bead into the retention channel, whereby the discrete fastener elements collectively retain the bead within the retention channel.

Another aspect of the invention features a method of making a continuous releasable fastening. The method includes providing a base on which fastener elements forming opposed rows of multiple discrete fastener elements are molded to form a retention channel between the rows. Each of the discrete fastener elements includes a stem and a resilient hook directed towards an opposing row of fastener elements. The method further includes molding a longitudinal retention bead on an attachment flange, the bead being configured to be retained between the hooks of the opposed rows of fastener elements when pressed into the retention channel.

In some applications forming the opposed rows includes molding a first row with hooks facing both directions orthogonal to the longitudinal direction of the row; and molding second and third rows on either side of the first row with hooks directed towards the first row.

In some other applications forming the opposed rows of multiple discrete fastener elements includes molding longitudinal rails having a profile of the fastener elements and severing the continuous rails to form the multiple discrete fastener elements. The severed rails can be stretched to increase spacing between the multiple discrete fastener elements.

In some applications, the method includes forming the bead and attachment web integrally of a seamless body of resin.

In some applications, the method includes forming the retention channel with at least first and second distinct engagement profiles. In some instances, the first and second distinct engagement profiles are formed of fastener elements of different lengths. In some instances, the first and second distinct engagement profiles are formed by first and second hooks positioned at different heights within the rows.

In some applications, the method includes forming multiple adjacent rows of fastener elements forming adjacent retention channels on the base.

In some applications, the method includes forming a second attachment bead adjacent the first attachment bead for engaging the adjacent retention channels. In some instances, at least some of the discrete fastener elements comprise multiple hooks extending in opposed directions to form part of two adjacent retention channels.

Another aspect of the invention features a method of forming a releasable fastening. The method includes providing a base with parallel rows of multiple opposed discrete fastener elements extending from the base and defining a retention channel between the rows, the discrete fastener elements each comprising a stem and a hook and providing a longitudinal retention bead positioned along an edge of an attachment web, the bead constructed to be removably received and retained in the retention channel between the rows of the fastener elements. The method further includes inserting the bead into the retention channel, whereby the discrete fastener elements are individually temporarily displaced by the bead and individually rebound such that the hook of the discrete fastener elements individually and collectively retain the bead within the retention channel.

In some applications, the method includes withdrawing the bead from the retention channel by temporarily deforming each of the discrete fastener elements retaining the bead sufficiently to release the bead from the retention channel.

Another aspect of the invention features a method of securing a fastener strip within a mold cavity. The method includes providing a fastener strip comprising a base and parallel rows of multiple opposed discrete fastener elements extending from the base and defining a retention channel between the rows, the discrete fastener elements each comprising a stem and a hook; and providing a mold surface comprising surface features constructed to removably received and retained in the retention channel between the rows of the fastener elements. The method further includes pressing the retention channel over the mold surface features whereby the discrete fastener elements are individually temporarily displaced by the mold surface features and at least partially rebound to collectively retain the mold surface features within the retention channel to secure the fastener strip within the mold cavity.

In some instances, the mold surface feature is a continuous longitudinal bead. In some cases, the bead is discontinuous. In some instances, the bead is segmented to enable the fabric panel to more closely follow a curvature of the retention channel.

In some applications, the method includes molding a foam article in the mold cavity such that the fastener strip becomes bonded to the foam article.

In some applications, the method includes removing the foam article with the fastener strip from the mold cavity and securing a fabric panel to the foam article by inserting into the retention channel a longitudinal retention bead extending along the fabric panel.

In some cases, the base is an elastomeric base, such as a film. Thus, the base and retention channel can be substantially flexible, bendable touch fastener product. In other cases, the base is a more substantial, rigid foundation or substrate, such as a plastic or metallic board or structural member. Thus, the base can be substantially inflexible.

In some cases, the fastener elements include stems integrally molded with the base material. In some cases, the male fastener elements have loop-engageable heads molded at distal ends of the stems. In some cases, the male fastener elements are hook-shaped with single or multiple crooks at the ends of molded stems. The crooks can also be of molded form, employing fixed mold cavities such as described in Fischer U.S. Pat. No. 4,872,243.

In some cases, fastener stem preforms may be molded, followed by "flat-topping" or other forming operations for forming loop-engageable heads. Thus, the stems may thus be flat-topped after being formed on a base material.

The attachment web is dimensioned to permit attachment of the fastener strip to a fabric panel via at least one of welding, bonding and stitching. In some cases, the web is formed by welding. In some cases, the fabric panel is welded along a surface of the web.

In some implementations, the base is notched at intervals along its length to increase bendability of the fastener strip. Similarly, in some implementations, the bead or web are notched at intervals along its length or segmented to increase bendability.

In some embodiments, the fastener strip is constructed and arranged to be frangible during recycling of the seat bun. In a particular embodiment, the frangible fastener strip is constructed and arranged with sections of reduced cross-section to be readily rent or sectioned with the seat or seat cover during recycling.

For more detail about in situ lamination processes and apparatus the reader is referred to U.S. Pat. No. 5,260,015 to Kennedy, et al., which discloses laminates of various materials, and to U.S. Pat. No. 5,441,687, to Murasaki et al., which discloses another form of in situ lamination in which lamination occurs while hooks being formed are still in their mold cavities.

The attachment bead is preferably supported at the end of a web, e.g., fabric, film, plastic tab, etc. The bead and fastener strip need not be coextensive, but may attach intermittently. The cross-section of the bead is sized to be substantially received between the hook rows of the attachment strip, such that insertion displaces or bends the fastener elements as the bead is inserted into the attachment strip. The bent fastener elements substantially return to their unloaded shape when the bead is fully inserted into the attachment strip. When the bead is fully inserted into the attachment strip, the fastener elements capture the bead on the end of the web and resist removal of the captured bead from the attachment strip.

This attachment system may be used, for example, in clothing or to fasten a seat cover onto an automotive seat foam bun or seat frame. This design can provide substantially continuous attachment along the length of the attachment strip and bead. The independence of the fastener elements permits the attachment strips to flex along the horizontal and vertical axes and to conform to a non-linear shape. The heads, stems and base can each be configured with a desired degree of flexibility to achieve a desired engagement and disengagement characteristic. The bead may be dimensioned to provide a particular desired engagement position when engaged with the fastener elements, rather than a wide range of possible engagement positions as with engagement of fastener elements with a broad field of loops. This may enable more precise fit of seat covers, for example.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 2:
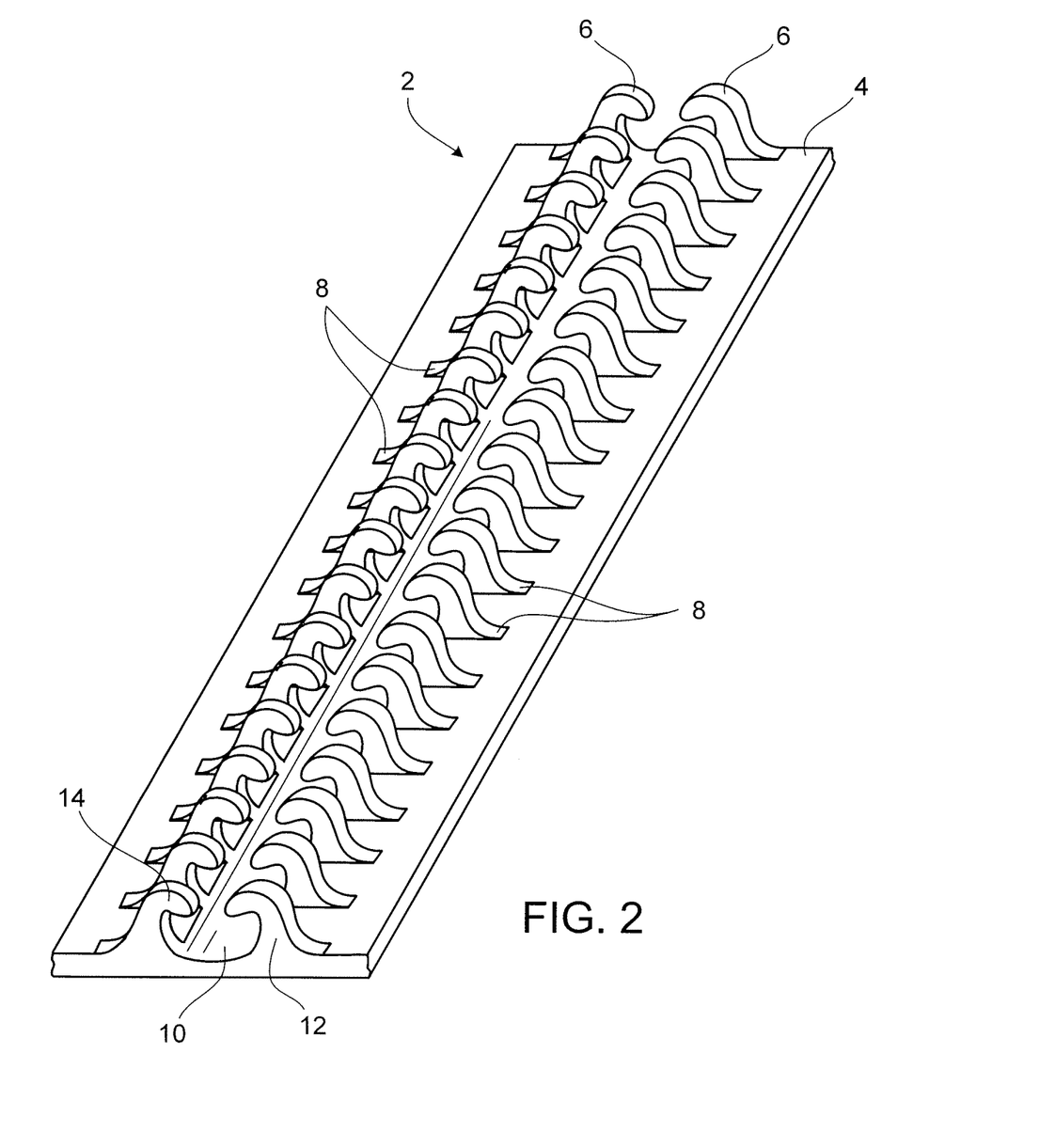
FIG. 2 is a perspective view of a flexible fastener strip defining a retention channel.

FIG. 2 is a perspective view of a flexible fastener strip 2 including a base 4 and parallel rows 6 of opposed discrete fastener elements 8 extending from base 4 and defining a retention channel 10 between rows 6. Discrete fastener elements 8 each including a stem 12 and a head 14. Base 4 and rows 6 of discrete fastener elements 8 can be integrally formed of a seamless body of resin. Alternatively, discrete fastener elements 8 can be molded onto a preformed base 4.

Heads 14 of the discrete fastener elements 8 extend inward toward the center of retention channel 10 to define an overhang at the top of retention channel 10. Fastener elements 8 can be substantially aligned across retention channel 10 or can be partially offset.

Discrete fastener elements 8 are closely spaced within rows 6. For example, discrete fastener elements 8 can be minimally spaced to provide sufficient clearance to allow independent movement of adjacent fastener elements 8. Alternatively, fastener elements 8 can be spaced multiple stem widths apart. Fastener spacing within rows 6 can be selected based on anticipated loading or other factors. For example, dense spacing may be advantageous to prevent twisting of heads 14 of fastener elements 8 under side-to-side loading and to resist higher separation loading. Alternatively, greater spacing may be advantageous for ease of installation or separation. In a particular implementation, fastener elements 8 are spaced between about 1 and 5 stem widths apart. In a particular implementation, fastener elements 8 are arranged in a density of at least about 12 per linear inch (5 per cm) within rows 6. Some implementations can have as many as 50 fastener elements per lineal inch (20 per cm).

The term "row" refers to a generally linear pattern of fastening elements. The fastening elements are aligned in rows along the longitudinal dimension of the fastener strip. Fastener elements in a given row and rows forming a given retention channel may be identical, regular, irregular, staggered, or any configuration.

Figure 3:
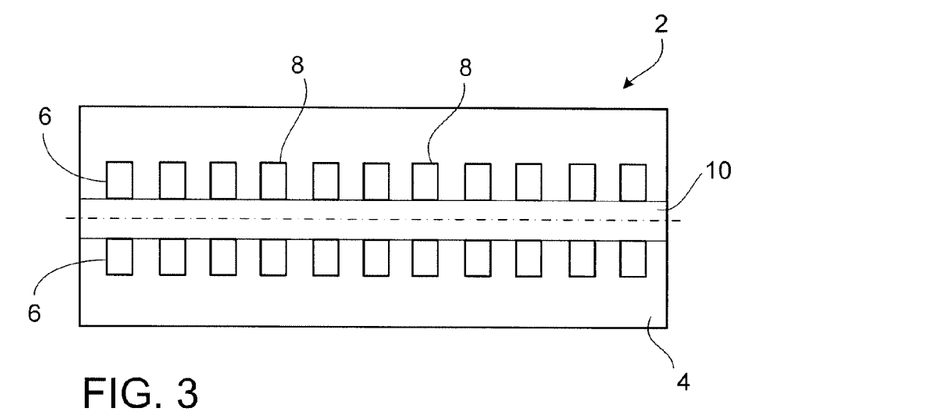
FIG. 3 is a top view of the fastener strip of FIG. 2.

FIG. 3 is a top view of the fastener strip of FIG. 2 showing opposed discrete fastener elements 8 arranged in rows 6 to define retention channel 10 on base 4. Base 4 is constructed from a resin, such as a polyester, polypropylene, nylon, or other polymeric material, and has a nominal thickness of about between about 0.25 mm to 2 mm, exclusive of the height of the touch fastener elements. In some embodiments, fasteners elements having a stem length of about 200 mm and a stem width of about 4 mm. Selvedge areas can be as thin as 0.08 mm, to provide advantageous flexibility to conform to mold contours.

In some implementations, the fastener elements are 3 to 10 mm high with about 2 to 5 hooks per lineal cm. Hook width can be between 0.5 mm and 4 mm, such as about 2 mm.

In some embodiments, fastener elements 8 are molded as discrete projections onto a preformed base 4. For more detail about fields of hook fastener elements and their formation, the reader is referred to U.S. Pat. Nos. 7,214,334; 7,172,008; 7,052,638; 7,048,818; 6,996,880; 6,991,843; 6,960,314; 6,878,332; 6,869,554; 6,066,281 and 6,660,121.

Touch fastener elements may also be formed by molding the stems and post-forming the end of the stems to form the fastener heads. Extruded touch fastener products may also be formed by extruding with fastening element rails, then cutting and stretching the element rails.

Touch fastener elements may be formed by removing the material between proposed fastener elements creating the space without requiring a stretch. This can be accomplished with a toothed blade (saw cutter), skiving blade or even ultrasonically.

In some cases, forming the touch fastener elements includes extruding resin to form longitudinal rails on the base outer surface while extruding the base, and then cutting the rails to form respective longitudinal rows of discrete touch fastener elements. The base can be stretched in the longitudinal direction after cutting the rails, to space apart the fastener elements in each row.

Figure 4:
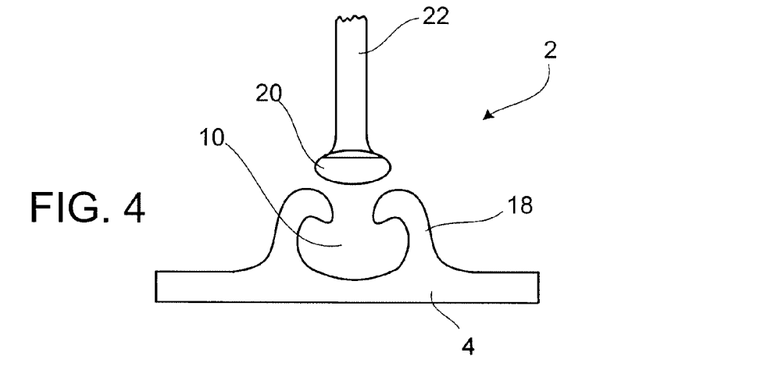
FIG. 4 is an end view of the touch fastener strip of FIG. 2 including a retention bead to be received in the retention channel.

FIG. 4 is an end view of fastener strip 2 of FIG. 2 including a longitudinal retention bead 20 to be received in retention channel 10. Retention bead 20 is configured to be removably received and retained in retention channel 10 between rows 6 of fastener elements 8. An attachment web 22 extends along retention bead 20 and away from retention channel 10 when bead 20 is retained in retention channel 10.

Retention bead 20 and attachment web 22 can be integrally formed from a seamless body of resin. Alternatively, Bead 20 can be formed on a preformed web 22. For example, bead 20 can be formed along an edge of a fabric panel. In some cases, attachment web 22 is adhered or stitched to a fabric panel, such as an automotive seat covering.

In some implementations, attachment bead 20 is constructed and dimensioned to fit loosely within retention channel 10 under heads 14 of fastener elements 8. In other implementations, retention bead 20 is sized to produce an interference fit with retention channel 10. In an interference fit configuration, discrete fastener elements 8 do not fully return to their unloaded position.

During insertion of retention bead 20 into retention channel 10, discrete fastener elements 8 deflect outwardly relative to retention channel 10 to receive the width of retention bead 20. Upon full insertion of retention bead 20 into retention channel 10, fastener elements substantially return to an unloaded position with heads 14 of fastener elements 8 overhanging a portion of bead 20.

While heads 14 of fastener elements 8 are shown as crooks, in some implementations heads 14 can be mushroom-shaped, palm tree-shaped, t-shaped, and the like. It is sufficient that heads 14 are configured to provide resistance to separation of retention bead 20 and retention channel 10.

In a particular example, fastener elements 8 extend between about 0.04 and 1 inches (1 to 2.5 mm) from the surface of base 4, for example 0.06 inch (1.4 mm). Typically, there are between 10 and 30 hooks per square cm of fastener, such as 15 hooks per square cm.

In one example, fastener elements are hooks of CFM-29 designation, available from Velcro USA Inc. of Manchester, N.H., U.S.A. Such fastener elements are only 0.015 inch (0.38 mm) in height, with a width of 0.024 inch (0.61 mm), and a thickness of 0.006 inch (0.15 mm).

In some cases, fastener elements 8 may be spaced at a distance x, as little as 0.010 inch (0.254 mm) up to, e.g., 0.750 inch (19 mm) apart. The thickness of base 2, excluding the fastener element height, b, may be 0.003 inch (0.076 mm).

In a particular embodiment, first male profile 16 and second male profile 18 extend approximately 0.047 inches (1.194 mm) from base member 14 and first and second male members 16 and 18 are approximately 0.066 inches (1.676 mm) separate from each other along the central axis The precise amount of force required to open the releasable fastening can be controlled by increasing or decreasing the size of barbs 94.

Figure 5:
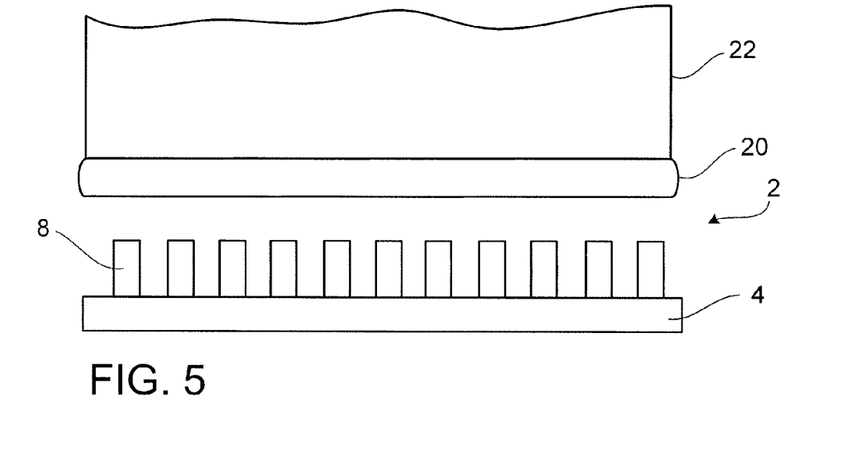
FIG. 5 is a side view of the fastener strip and retention bead of FIG. 4.

FIG. 5 is a side view of the fastener strip and retention bead 20 of FIG. 4. Fastener elements 8 collectively provide a substantially continuous retainer along the length of retention bead 20. Fastener strip 2 and bead 20 can be substantially flexible to permit installation, for example, in contoured automotive seating. Spacing of fastener elements 8 and/or the thickness of base 4 can be adjusted to provide a desired flexibility or stiffness.

Attachment web 22 can be constructed with sufficient stiffness to enable manual insertion of retention bead 20 into retention channel 10 via downward pressure on attachment web 22.

In some implementations, attachment web 22 is a substantially rigid plastic strip. In some cases, retention bead 20 is formed integrally with attachment web 22. In some cases, retention bead 20 is extruded onto, welded to or bonded to attachment web 22. Attachment web 22 can be sized to provide a desired attachment area for a fabric panel or other material to be anchored via fastener strip 2.

In some implementations, retention bead 20 is a lower longitudinal edge portion of attachment web 22 separated from the main body of attachment web 22 by a web portion of reduced cross-section configured to receive heads 14 of fastener elements 8.

In some implementations, fastener elements 8 are configured to releasably retain retention bead 20 in repeated engagement cycles. This can be advantageous for repositioning during seat cover installation, for recovering or for removal for cleaning Alternatively, it may be advantageous in particular implementations for fastener elements 8 to be configured for limited or even single use, for example due to deformation of heads 14 of fastener elements 8 upon removal of retention bead 20 from retention channel 10.

Fastener strip 2 can be provided as a continuous anchor along a length of a fabric panel or trim section to provide uniform tension or support along the full panel edge length. The continuity of the engagement of retention bead 20 and retention channel 10 along the full panel edge length reduces puckering, wrinkling or other distortions common in point or clip-style installations. Alternatively, fastener strip 2 can be provided at intervals similar to prior art clip-style installations.

In some implementations, attachment web 22 is substantially flexible, for example, when attachment bead 20 is formed along an edge portion of a fabric panel. In such cases, it can be advantageous to size attachment bead 20 and retention channel 10 to permit manual insertion of retention bead simply by pressing the bead into the channel with one's fingertips.

For some applications it is advantageous to provide a ledge or other projection feature of increased cross-section above retention bead 20 and retention channel 10 on attachment web 22. This ledge can enable application of increased insertion forces as a type of manual grip or tool catch without interfering with the retention channel. Alternatively, apertures in a rigid or semi-rigid attachment web can provide similar advantages.

Retention bead 20 can be sized to fit loosely up and down within retention channel 10 or to fit snugly between base 4 and heads 14 of fastener elements 8.

Figure 6:
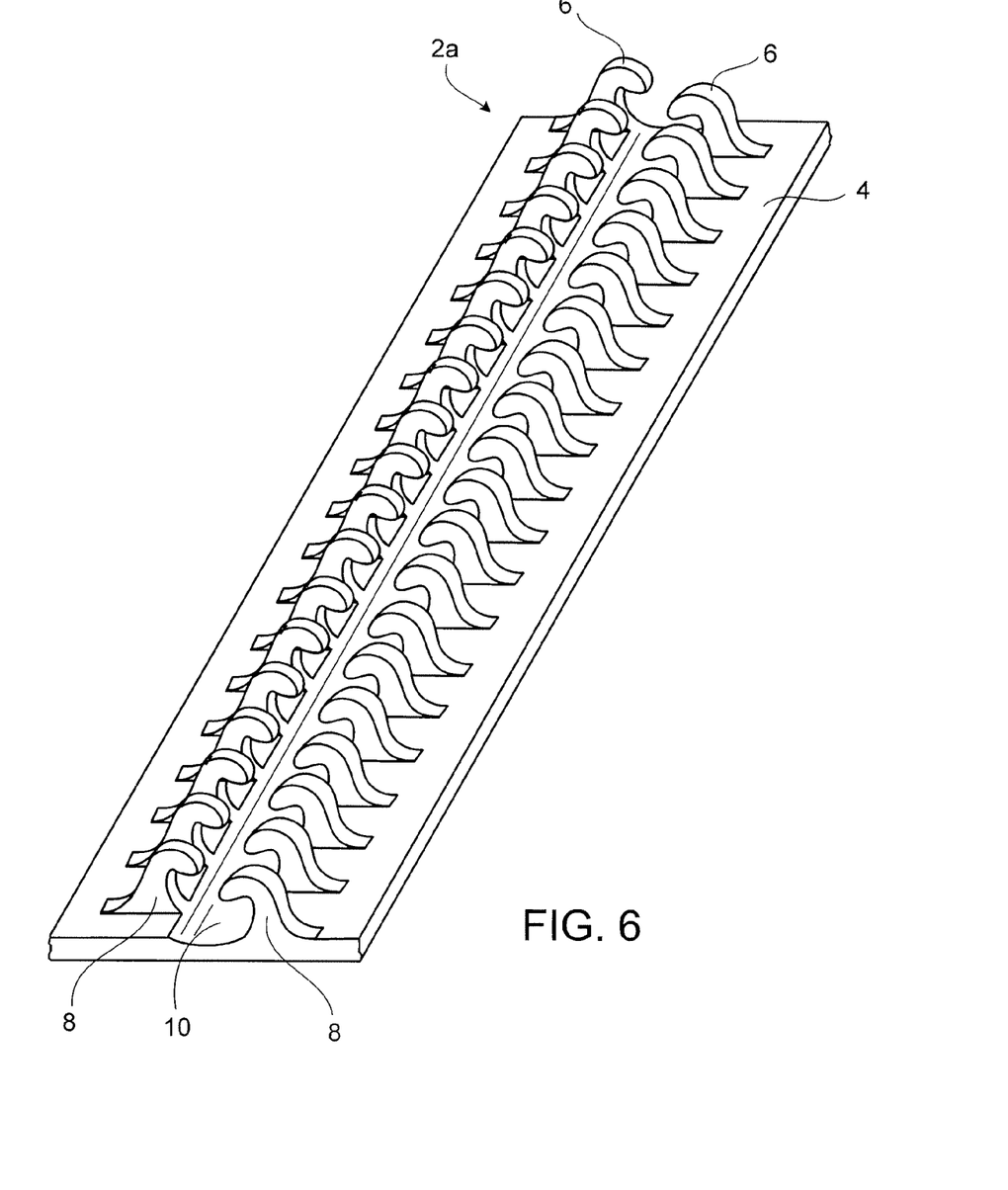
FIG. 6 is a perspective view of another fastener strip having offset fastener elements defining the retention channel.

FIG. 6 shows another implementation of fastener strip 2a in which fastener elements 8 are offset across retention channel 10. In some implementations, the position of a fastener element in one row substantially corresponds to an opposing space between fastener elements in the opposing row.

In some implementations, fastener elements 8 in one row 6 are substantially identical to fastener elements 8 in an opposing row 6. In other implementations, the rows of fastener elements differ in the dimensions, profile, stiffness or other properties of the opposed discrete fastener elements. For example, it may be advantageous to have one row of elements be more flexible than another such that one flexible row is more easily deflected for ease of insertion while an opposed stiffer rows resists separation.

In some implementations, fastener elements 8 are arranged in spaced apart row segments. In some instances, the segments of the opposed rows are substantially aligned across the retention channel. In some instances, the segments can be partially offset across the retention channel. In some cases, a different size, number of density of fastener elements can be used in opposing rows.

Figure 7:
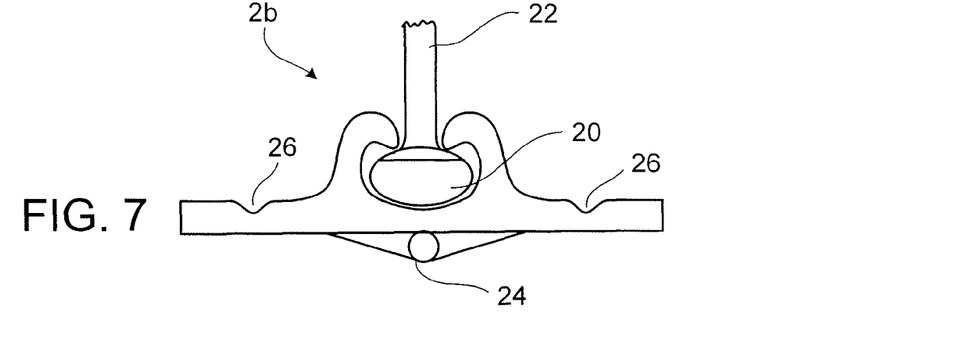
FIG. 7 is an end view of another fastener strip having a magnetically attractable strip and flexure recesses.

FIG. 7 is an end view of another fastener strip 2b having a magnetically attractable strip 24 and flexure recesses 26.

Magnetically attractable strip 24 can be a wire, metallic composite, or other metal containing body suitable to enable magnetic attraction or retention of fastener strip 2b. Such magnetic retention can be advantageous, for example, during foam molding process as described with regard to FIG. 13.

For example, a wire may provide the benefit of magnetic attraction or shape memory. Magnetic attraction may be desirable in retaining fastener strip 2b in position in a mold or other application.

Flexure recesses 26 extend longitudinally along base 4 adjacent rows 6. The reduced thickness of recesses 26 provides a defined flexure region. This can be advantageous, for example, in providing increased flexibility of fastener strip 2b or improved sealing during mold-in operations and a simulated flexible edge to improve foam adhesion.

During the foaming process, it is useful to keep the foaming resin from flowing between the discrete male fastener elements, and various sealing means have been developed. For example, a protective layer, often in the form of a thin plastic film, may be placed over the resilient hooks (before they are placed in the mold) to prevent incursion of foam into the hooks during the molding process. After molding, the film or other cover is removed to expose the fastener elements. Selvedges or gaskets have also been provided around the perimeter of touch fastener products, to inhibit foam intrusion into the hook area.

Figure 8:
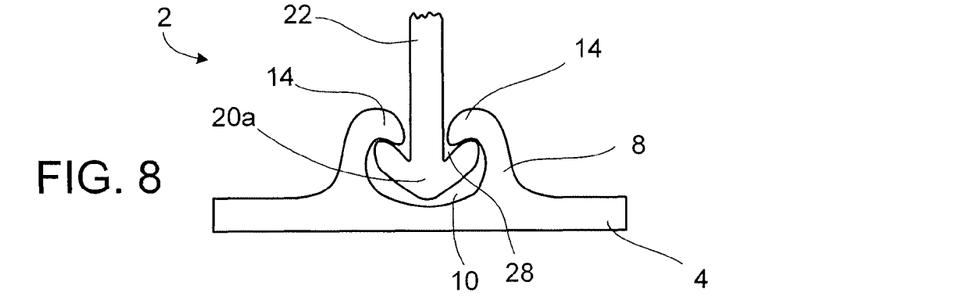
FIG. 8 is an end view of another fastener strip with recesses on the retention bead to receive the fastener element tips.

FIG. 8 shows another fastener strip 2 with recesses 28 on the retention bead 20a to receive heads 14 of fastener elements 8. In some implementations, recesses 28 increase the resistance to separation by making distention of heads 14 of fastener elements 8 the primary release mechanism, as opposed to deflection of stems 12 of fastener elements 8 under separation loading.

Recesses 28 and fastener element heads 14 can be configured to provide a desired degree of engagement throughout a range of extraction of bead 20a from retention channel 10. For example, in some implementations, recesses 28 and fastener elements heads 14 are configured to allow engagement along a substantial portion of the crook of head 14 of fastener element 8. This can be accomplished with complementary curved profiles. Such curved profiles can provide a more uniform resistance over a range of separation.

Alternatively, in some implementations, a sharper profile can provide a more abrupt initial resistance followed by a quicker release. For example, a sharp projection adjacent recess 28 on bead 20 and a sharp crook on head 14 of fastener element 8 can produce a relatively high degree of resistance until heads 14 deflect to abruptly release bead 20.

Any number of combinations of bead and fastener element profiles can be selected to provide desired engagement and resistance to separation properties. For example, in some cases the cross-section of the bead is substantially circular, T-shaped, or of other generally symmetrical geometry. In another example, the bead is V-shaped or heart-shaped to define a recess to receive the distal hook/head of fastener elements 8.

Bead 20 can be a continuously extruded shape, can be segmented, or can be disposed at spaced locations to connect with fastener strip 2 at spaced locations. Similarly, fastener strip base 4 and/or bead 20 can include slits or notches that permit additional flexure in one or more axes, e.g., to form or follow a non-linear shape.

Figure 9:
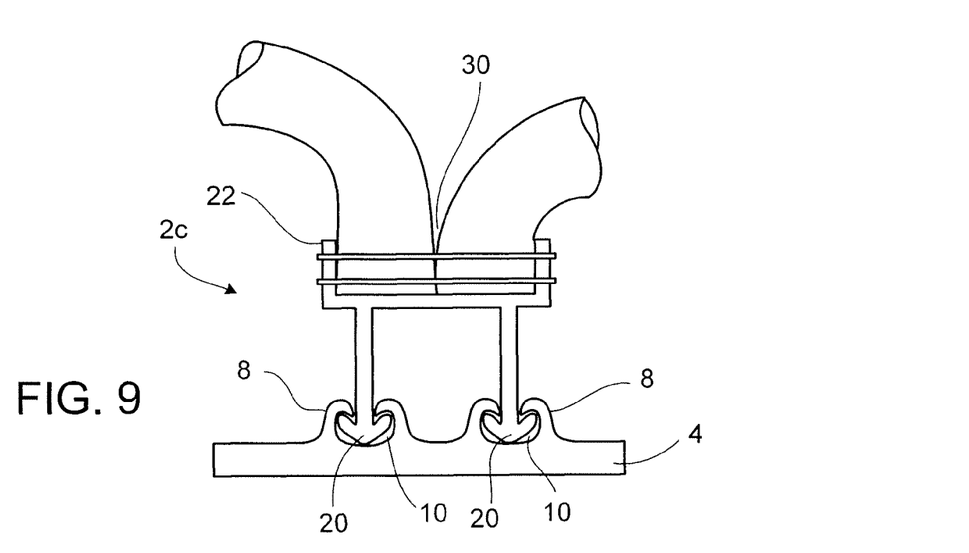
FIG. 9 is an end view of another fastener strip having dual retention channels and beads attached to a fabric panel seam.

FIG. 9 is an end view of another fastener strip 2c having dual retention channels 10 and retention beads 20 attached to a fabric panel seam 30. Fastener strip 2c includes two attachment webs 22, one on either side of seam 30.

In some implementations, a single attachment web 22 can be positioned to either side or in the middle of seam 30. In some implementations, attachment web 22 can be formed as a semi-rigid or rigid channel, such as for crimping onto seam 30 using staples or other mechanical fasteners. Web 22 can be secured to seam 30 by stitching, thermal welding or the like.

Dual retention channels 10 and retention beads 20 are shown as substantial duplicates. However, different combinations of bead and channel dimensions, profiles or properties can be advantageous in particular applications. For example, in some instances, retention channels of different height can be configured to receive retention beads 20 in multiple stages. This can be advantageous in providing a first loose engagement to allow for uniform positioning of the seat covering prior to engagement of the second tighter fitting engagement bead.

Similarly, attachment bead 20 can include sequential engagement features such as multiple ledges to provide a range of degrees of engagement. In such instances, an audible ratcheting sound can accompany the incremental engagement and separation of bead 20 and channel 10.

Fastener strip 2 can include multiple attachment webs 22 to provide multiple regions for attachment of fabric panels or upholstery seams on a single fastener strip 2. In the context of a seat cover application, accent panels about the width of fastener strip 2c can be stitched with a central panel edge along a first web and with a side panel edge along a second web 22 of fastener strip 2. In other contexts, it may be advantageous to have two adjacent panels more loosely associated through fastener strip 2 than to share a common seam. For example, separate attachment of two panels to independent webs 22 may reduce the risk of simultaneous failure of the edge attachment or seam of both panels.

Figure 10:
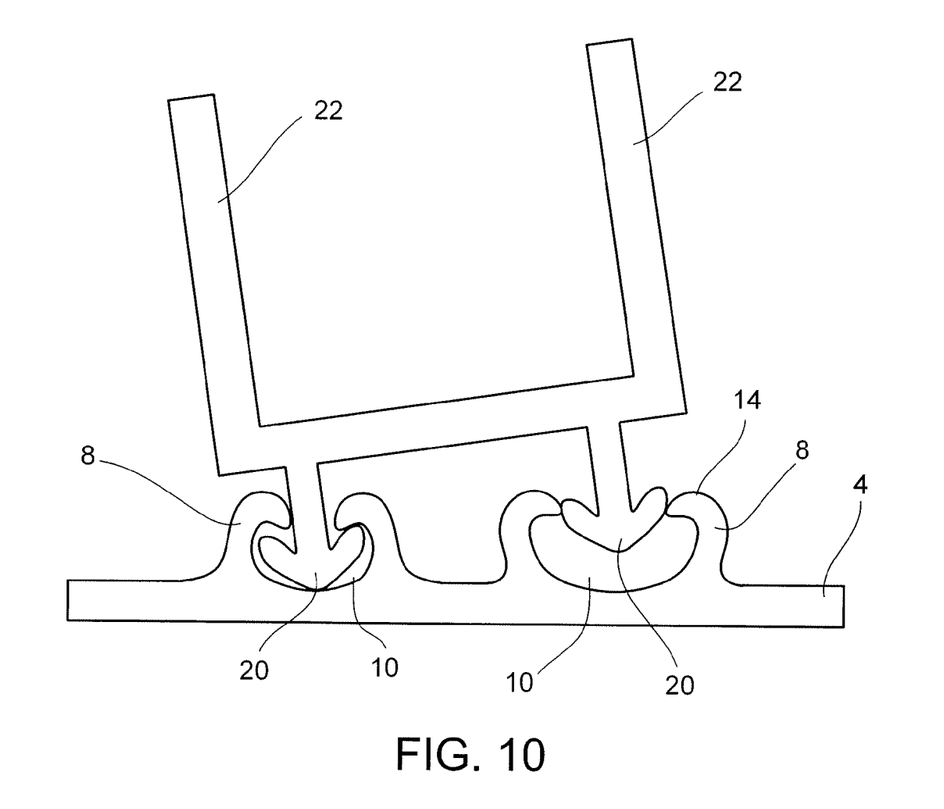
FIG. 10 is an end view of the fastener strip of FIG. 9 with the dual retention beads seated, partially seated in or partially unseated from the dual retention channels.

FIG. 10 shows the fastener strip of FIG. 9 with one of the dual retention beads 20 seated and the other retention bead 20 partially seated in the corresponding retention channels 10. During insertion of bead 20 into retention channel 10, fastener elements 8 deflect outward to accommodate bead 20. Upon full insertion, fastener elements 8 rebound towards an unloaded position with heads 14 extending over a portion of bead 20.

During separation, heads 14 of fastener elements 8 distend and/or fastener elements 8 deflect under sufficient separation loading to release beads 20 from channel 10. Beads 20 can be more easily removed by incremental release of discrete fastener elements 8 along retention channel 10.

Figure 11:
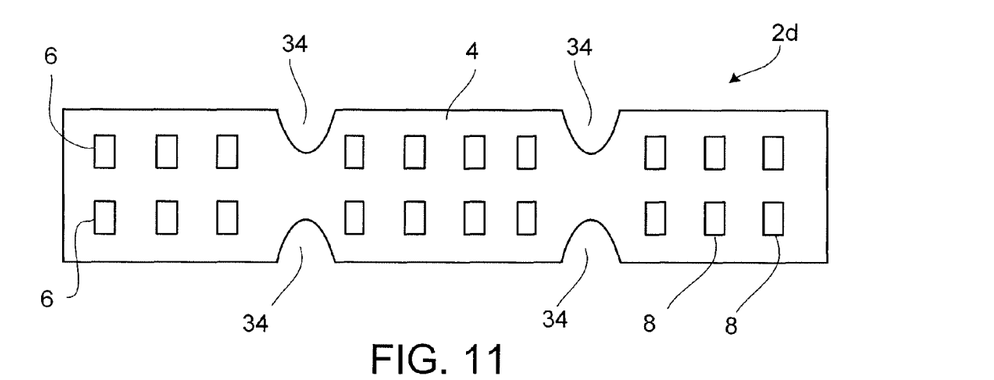
FIG. 11 is a top view of a segmented fastener strip.

FIG. 11 is a top view of another fastener strip 2d in which base 4 is segmented by apertures 34 to provide increased in-plane flexibility. Segmentation can also be advantageous in that a segmented fastener strip 2d can be more readily shredded during recycling of a seat foam bun.

Figure 12:
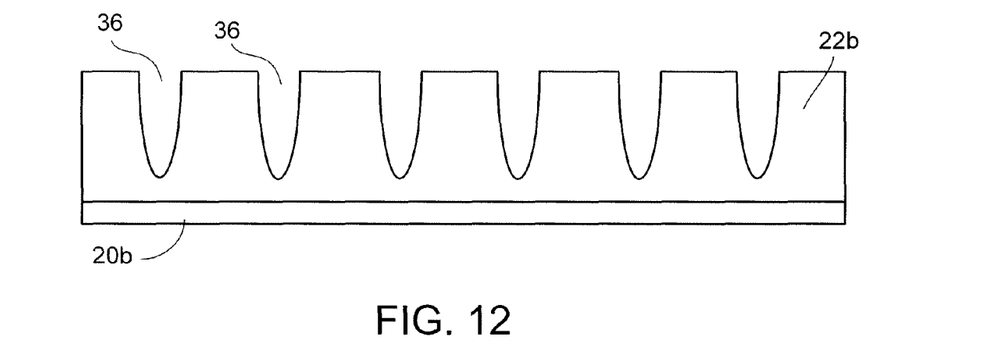
FIG. 12 is a side view of a segmented retention bead.

FIG. 12 shows a continuous retention bead 20b at a distal edge of a web 22b defining apertures 36. Segmentation of web 22b provides increased flexibility to match a contour when sewing to a trim seam.

Figure 13:
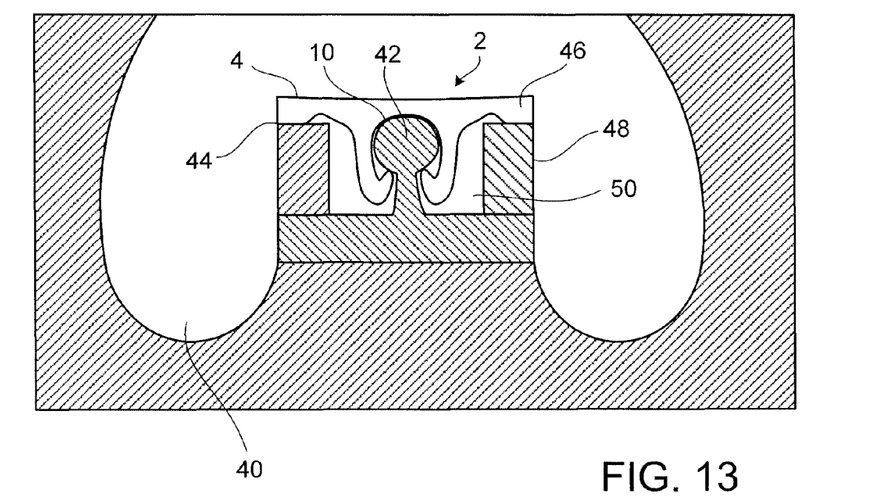
FIGS. 13 and 13A are sectional side views of two alternate mold cavity designs, with a fastener strip retained via the retention channel in preparation for foaming.

FIG. 13 shows a sectional side view of a mold cavity 40 including fastener strip 2 retained therein via retention channel 10. Fastener strip 2 is positioned in a mold in which an article, such as a foam seat cushion, will be made. Fastener strip 2 is used as an insert in a mold-in process and is retained in mold cavity 40 by a complementary mold feature 42, such as a T-shaped projection. This can advantageously provide a secure anchor for fastener strip 2 and a tight seal between selvedges 46 of base 4 and mold surface 44.

Mold feature 42 is preferably sized such that it sufficiently fills the opening between opposing fastener elements that, even if foam infiltrates into trench 50 it will not take the place occupied by the mold feature 42. Thus, after removal of the foamed product from the mold there will remain an open space between the fastener elements that had been occupied by mold feature 42.

In some implementations, mold feature 42 is recessed sufficiently below mold surface 44 to cause lateral selvedges edges 46 of base 4 to deflect upwards as fastener strip 2 is pressed into engagement with mold feature 42. This deflection increases sealing contact pressure between selvedges 46 and mold surface 44. In some implementations, selvedges 46 include flexure recesses or regions of reduced cross-section for deflection of selvedges 46.

Mold cavity 40 includes a pedestal 48 defining a trench 50 configured to protect fastener elements 8 during molding operations. Mold 40 further includes sidewalls and a floor. Pedestal 48 has a base, which extends between the mold sidewalls, and a standing portion defining trench 50. Trench 50 also has sidewalls and a bottom wall. Pedestal 48 and trench 50 are elongated, in a direction that extends into FIG. 13. The trench may be straight, or curved in a plane in two dimensions from left to right, as shown, and it may also undulate in two dimensions in a plane up and down, from the top of the bottom in the figure, as shown. It may be curved through three dimensions in space.

The foregoing illustrates placing the fastening component in a trench, in a pedestal, rising from the bottom wall of the mold. The trench may also be in a sidewall of the mold, as the engagement of retention channel and mold feature is adequate to retain the fastening component in such an orientation also. In addition, it is not necessary that there be a pedestal to define a trench. Of course, without a pedestal, the fastener strip may not be within a recess in the molded article.

In use, fastener strip 2 is inserted into trench 50, such that fastening elements 8 face the bottom wall of trench 50, and the back of the base faces into the mold cavity 40. Selvedges extend along the length of fastening strip 2, as discussed above, and are sized and shaped relative to trench 50 such that fastening strip 2 is resiliently press-fit into trench 50, with retention channel 10 received over mold feature 42 to retain fastening strip 2 in trench 50 during molding operations. Typically, the retention channel 10 can be pressed onto mold feature 42 simply by the operator applying finger pressure to press fastener strip 2 into trench 50.

During a molding operation, molding material fills mold cavity 40. As the mold material, e.g., foam resin, is poured or flowed into the mold, it is typically liquid and may tend to infiltrate between the mold body and the fastening surface of fastener component 2. Selvedges 46 deflect to form a seal with mold surface 44 against foam intrusion. This can be used in conjunction with or in place of other types of hold-down arrangements, such as magnetic schemes.

The fastener strip is placed into the trench in the mold, such that the fastener strip curves to follow the trench, with the fastening surface facing a bottom of the trench. A liquid molding material is introduced into the mold, such that it contacts an anchoring surface of the fastener strip. The anchoring surface can include projections, opposite a surface bearing the fastener elements; wherein the projections are configured to anchor the strip to a molded article. The molding material is allowed to solidify into a molded body into which the fastener strip has been molded. The molded body and incorporated fastener strip are removed from the mold.

Figure 13A:
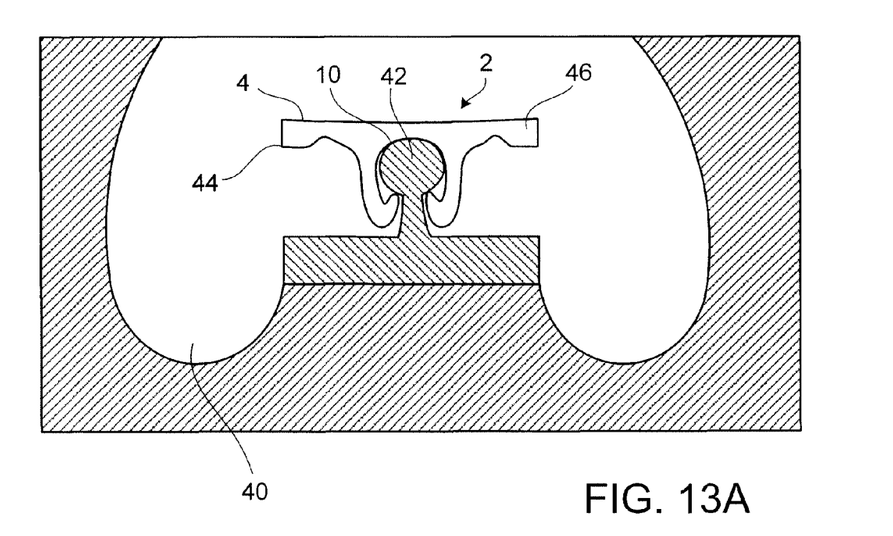

FIG. 13A shows an alternate mold cavity design in which the selvedges of the fastener strip are not supported but overhang the surface of the mold, such that upon molding they become fully embedded within the foam. In this example, foam extends into all unoccupied spaces and surrounds the individual fastener elements, including extending between the adjacent fastener elements of each row, such that upon removal from the mold cavity, the foamed product features a trench of an extent and size corresponding to mold feature 42, into which the mating web bead can be pushed to be retained by the embedded fastener elements. This design provides a very strong retention of the fastener strip within the foam.

All patents referenced herein are incorporated by reference in their entirety.

A number of embodiments of the invention have been described. Nevertheless, it will be understood that various modifications may be made without departing from the spirit and scope of the invention. For example, fastener elements 8 need not include a curved head portion and can include, for example, a mushroom-shaped or multi-projection head. The bead and fastener strip need not be coextensive, but may attach intermittently. Accordingly, other embodiments are within the scope of the following claims.

What is claimed is:

1. A covered cushion comprising
a foam body having a first fastener secured thereto; and
a cover extending over the foam body and having a second fastener secured thereto;
wherein the first and second fasteners together form a touch fastening holding the cover to the foam body and comprising two mating strips including:
 a first strip comprising a base having parallel rows of discrete fastener elements extending from the base and defining a retention channel between the rows, the discrete fastener elements each comprising a stem and a head at a distal end of the stem and overhanging the base; and
 a second strip comprising an attachment web with a longitudinal retention bead extending along a distal edge of the web, the bead having a lateral dimension greater than an entrance width of the retention channel and being configured to be removably received and retained in the retention channel between the rows of the fastener elements;
wherein the discrete fastener elements within each row are spaced apart at a density between about 5 and 50 fastener elements per inch.

2. The covered cushion of claim 1, wherein the bead has a lateral dimension that is greater than a distance between opposing heads of the fastener elements and that is less than a distance between opposing stems of the fastener elements.

3. The covered cushion of claim 1, wherein the opposed discrete fastener elements are substantially aligned across the retention channel.

4. The covered cushion of claim 1, wherein the bead and attachment web are integrally formed of a seamless body of resin, and/or wherein the discrete fastener elements and the base together form a single, seamless body of resin.

5. The covered cushion of claim 1, wherein the discrete fastener elements are spaced apart within the respective rows less than about one fastener width along the rows.

6. The covered cushion of claim 1, wherein at least one of the strips is notched or segmented to permit lateral flexure, and/or wherein the base defines a longitudinal flexure recess of reduced stiffness adjacent at least one of the rows.

7. The covered cushion of claim 1, wherein the heads of the discrete fastener elements each define a crook and the bead defines recesses configured to receive the crooks to resist separation of the bead and fastener elements.

8. The covered cushion of claim 1, further comprising a second pair of opposed rows of discrete fastener elements defining a second retention channel configured to retain a second bead.

9. The covered cushion of claim 1, wherein the fastener elements include fastener elements of differing engagement profiles.

10. The covered cushion of claim 1, wherein the first fastener comprises the first strip, and the second fastener comprises the second strip.

11. The covered cushion releasable touch fastening of claim 1, wherein the fastener elements include fastener elements of different lengths.

12. A method of molding a foam article including a releasable touch fastener strip, the method comprising:
   providing within a mold cavity a fastener strip comprising a base and parallel rows of multiple opposed discrete fastener elements extending from the base and defining a retention channel between the rows, the discrete fastener elements each comprising a stem and a head and the discrete fastener elements within each row being spaced apart at a density of between about 5 and 50 fastener elements per inch;
   pressing the retention channel onto a. mold surface feature constructed to be removably received in the retention channel between the rows of the fastener elements, whereby the discrete fastener elements collectively retain the mold surface feature within the retention channel to secure the fastener strip within the mold cavity; and
   introducing a foam resin into the mold cavity and curing the foam whereby the fastener strip is bonded to a cured foam article.

13. The method of claim 12, further comprising removing the foam article with the fastener strip from the mold cavity and securing a covering to the foam article by inserting into the retention channel a longitudinal retention bead extending along one of a seam and edge of the fabric panel.

14. A method of covering a cushion, the method comprising:
   providing, on a cushion, a first releasable touch fastener strip comprising a base having parallel rows of discrete fastener elements extending from the base and defining a retention channel between the rows, the discrete fastener elements each comprising a stem and a head at a distal end of the stem and overhanging the base and the discrete fastener elements within each row being spaced apart at a density of between about 5 and 50 fastener elements per inch;
   providing, on a fabric covering, a longitudinal web having a longitudinal retention bead extending along a distal end of the web, the web having a lateral dimension greater than an entrance width of the retention channel; and
   securing the fabric covering to the cushion by inserting the bead into the retention channel, whereby the discrete fastener elements collectively retain the bead within the retention channel.

15. A method of engaging a releasable fastening, the method comprising:
   providing a base with parallel rows of multiple opposed discrete fastener elements extending from the base and defining a retention channel between the rows, the discrete fastener elements each comprising a stem and an overhanging head at a distal end of the stem and the discrete fastener elements within each row being spaced apart at a density of between about 5 and 50 fastener elements per inch;
   providing a longitudinal retention bead positioned along an edge of an attachment web, the bead configured to be removably received and retained within the retention channel between the rows of fastener elements; and
   inserting the bead into the retention channel, whereby the discrete fastener elements are individually and temporarily displaced by the bead and individually rebound such that the heads of the discrete fastener elements individually and collectively retain the bead within the retention channel.

16. A releasable touch fastening comprising two mating strips including:
   a first strip comprising a base having parallel rows of discrete fastener elements extending from the base and defining a retention channel between the rows, the discrete fastener elements each comprising a stem and a head at a distal end of the stem and overhanging the base; and
   a second strip comprising an attachment web with a longitudinal retention bead extending along a distal edge of the web, the bead having a lateral dimension greater than an entrance width of the retention channel and being configured to be removably received and retained in the retention channel between the rows of the fastener elements;
   wherein the discrete fastener elements within each row are spaced apart at a density between about 5 and 50 fastener elements per inch; and
   wherein the releasable touch fastening further comprises a second pair of opposed rows of discrete fastener elements defining a second retention channel configured to retain a second bead.

\* \* \* \* \*